United States Patent [19]

Jones, Sr.

[11] 4,213,063
[45] Jul. 15, 1980

[54] ROOM OCCUPANCY POWER PROGRAMMER

[76] Inventor: John L. Jones, Sr., 1070 Glen Oaks Blvd., Pasadena, Calif. 91105

[21] Appl. No.: 900,734

[22] Filed: Apr. 27, 1978

[51] Int. Cl.² .......................................... H01H 43/02
[52] U.S. Cl. .................................... 307/141; 307/140; 340/309.1
[58] Field of Search .................... 307/38, 112, 132 R, 307/140, 141.4, 141; 340/147 P, 309.1, 309.6

[56] References Cited

U.S. PATENT DOCUMENTS

| | | | |
|---|---|---|---|
| 3,573,360 | 4/1971 | Rose | 178/6.6 A |
| 3,761,912 | 9/1973 | Stettner | 340/309.1 |
| 3,800,524 | 4/1974 | Matsumura | 58/50 R |
| 3,808,456 | 4/1974 | Kay | 307/140 |
| 3,886,329 | 5/1975 | Kamiyama | 235/92 |
| 3,903,515 | 9/1975 | Haydon | 340/309.1 |
| 4,035,661 | 7/1977 | Carlson | 307/141 |

Primary Examiner—L. T. Hix
Assistant Examiner—S. D. Schreyer
Attorney, Agent, or Firm—J. L. Jones, Sr.

[57] ABSTRACT

The complete power programmer is secured in a conventional standard size room wall electrical outlet box, switching the conventional electrical wire transmitted power of the room on a preselected time schedule. An electrical power pulse source drives an electronic integrated micro circuit chip having a calendar real-time clock with instructions, a real-time storage first register, an ON-time storage second register, an OFF-time storage third register, and a digital time display. A rapid-time pulse generator provides quickly resettable real-time values for the above time registers. On signal, the real-time first register clock-time value can be equivalently compared by an integrated micro circuit chip comparator, alternately matching the ON-time second register clock-time value, and the OFF-time third register clock-time value, thus providing successive operating signals to an ON-OFF power switch at equivalences, operating conventional power and light circuits. An integrated micro circuit random number selector circuit daily provides a small number, whose equivalent number value in minutes is applied to operatively shift the ON-OFF time cycle for the electrical power forward or reverse in time as instructed every 24 hours of calendar time. A second micro chip random number selector circuit daily provides a small number of equivalent minutes interruption of the ON electrical power phase of the cycle.

5 Claims, 4 Drawing Figures

ROOM OCCUPANCY POWER PROGRAMMER

BACKGROUND OF THE INVENTION

This room occupancy power programmer invention relates to the horologic Class 58/23 R, the electronic circuit device Class 235/186, and the like classes.

Rose, in U.S. Pat. No. 3,573,360 (Cl. 178/6.6 A) discloses an electronic timer network for a tape web transport system. The electrical speed indications are converted to time pulses and then to binary bits. In U.S. Pat. No. 3,800,524 (Cl. 58/50 R) Matsumura discloses a digital electronic time piece in which the fundamental frequency signal is divided into a pulse signal of 1 Hz per one second. Kamiyama, in U.S. Pat. No. 3,886,329 (Cl. 235/92.5 B) discloses a preset counter apparatus utilizing electronic counter circuits operating from preset means.

There is an inventive advance in the programmer art in providing a very compact, permanent individual room occupancy power programmer which can be disposed in a room electrical wall outlet box and which can automatically operate a radio, television, tape recorder, vacuum cleaner and the like on a 24 hour cycle during the absence of the legal occupants of a premise.

SUMMARY OF THE INVENTION

A complete room occupancy power programmer has electronic integrated micro circuits and provides electrical power availability on a pre-selected time schedule. The complete power programmer can be permanently secured in a standard size room wall outlet box which conventionally houses electrical wiring for a room, and which can concurrently house conventional room light switches and/or electrical pronged socket receptacles. The power programmer provides pre-scheduled timed ON-OFF cycle switching for electrical power, utilizing the conventional electrical wiring circuit, suitable for operating lights, radio, tape recorder, television, vacuum cleaner, or the like. The power programmer can establish an illusion of room occupancy by people, in the complete absence of the legal occupants. This illusion diminishes the probability of burglary, as many burglars will not enter occupied premises.

The room occupancy power programmer comprises an electronic integrated micro circuit chip, and has an electric pulse source, a clock means, with instructions providing calendar real-time in a real-time storage first register, an ON-time storage second register, on OFF-time storage third register. On signal the above first, second and third storage time registers are resetable, utilizing a rapid-time pulse generator, and each of the above time values can be displayed on a digital real-time display. An integrated microchip comparator circuit means, with suitable interconnected electrical circuits and with instructions can separately compare and match the real-time clock signals of the real-time first register and the ON-time and OFF-time clock signals stored in the respective second register and third register. When the calendar real-time clock signal is equivalent to the ON-time clock signal, and also is separately equivalent to the OFF-time clock signal, a separate electrical power switch is operated, respectively switching the conventional 110 V AC power ON and OFF, as at a standard electric wall switch, and also at a conventional prong wall power outlet, as is previously time scheduled.

An integrated micro circuit chip random selector disposed in the programmer circuitry daily provides means for automatically shifting the ON-OFF time cycle for electrical power forward or reverse in time value in each 24 hour calendar time. The time cycle is numerically shifted by the number of minutes equivalent to the selected random number. A second random number selector circuit can provide a small number equivalent to minutes, for interrupting the ON electrical power phase of the cycle, during its use.

A pulse source has a 60 Hz, or the like, AC voltage utility power supply and also has a rectifier/shaper component in a conventional electronic integrated circuit means, providing a series of square waves of 60 Hz, or the like, frequency. In the clock means, the 60 Hz square waves are further processed and divided by a series of integrated circuit counters to provide real-time second and/or minute timing output pulses in the clock means. This clock means includes instructions for a calendar real-time storage first register, which can be set to the calendar real-time value.

An alternate pulse source combines a power battery driving a high frequency oscillator, together with a rectifier/shaper, disposed in a micro circuit. The combination produces square waves of the desired frequency. A series chain of microcircuit counters form a clock means which can receive the chopped pulse, providing an operating output pulse every second or minute of calendar time. The clock means also includes instructions for a calendar real-time storage first register, which can be set to calendar real-time value.

A rapid time pulse generator embodied in the integrated circuitry provides a means of rapidly changing the real-time storage first register, the ON-time storage second register, and the OFF-time storage third register, to the respective separate desired calendar real-time values as needed.

The room occupancy programmer is particularly useful in offices, stores, homes and apartments, providing electrical light and power activity during the absence of the legal occupant and simulating an occupied room appearance during multiple days absence. Included in the objects of this invention are:

To provide a permanent convenient room occupancy power programmer for room lights and other electrically operated devices disposed in a room, providing an automatic illusion of room use while the legal occupant is absent.

To provide a compact, permanent room occupancy power programmer which can be easily installed in existing room electrical wiring wall outlet boxes.

To provide a room occupancy power programmer which can automatically provide a varied daily time schedule of room occupancy appearance or room electrical appliance service.

Other objects and advantages of this invention are taught in the following description and claims.

BRIEF DESCRIPTION OF THE DRAWINGS

The description of this invention is to be read in conjunction with the following drawings.

THE PREFERRED EMBODIMENT OF THE INVENTION

Figure 1:
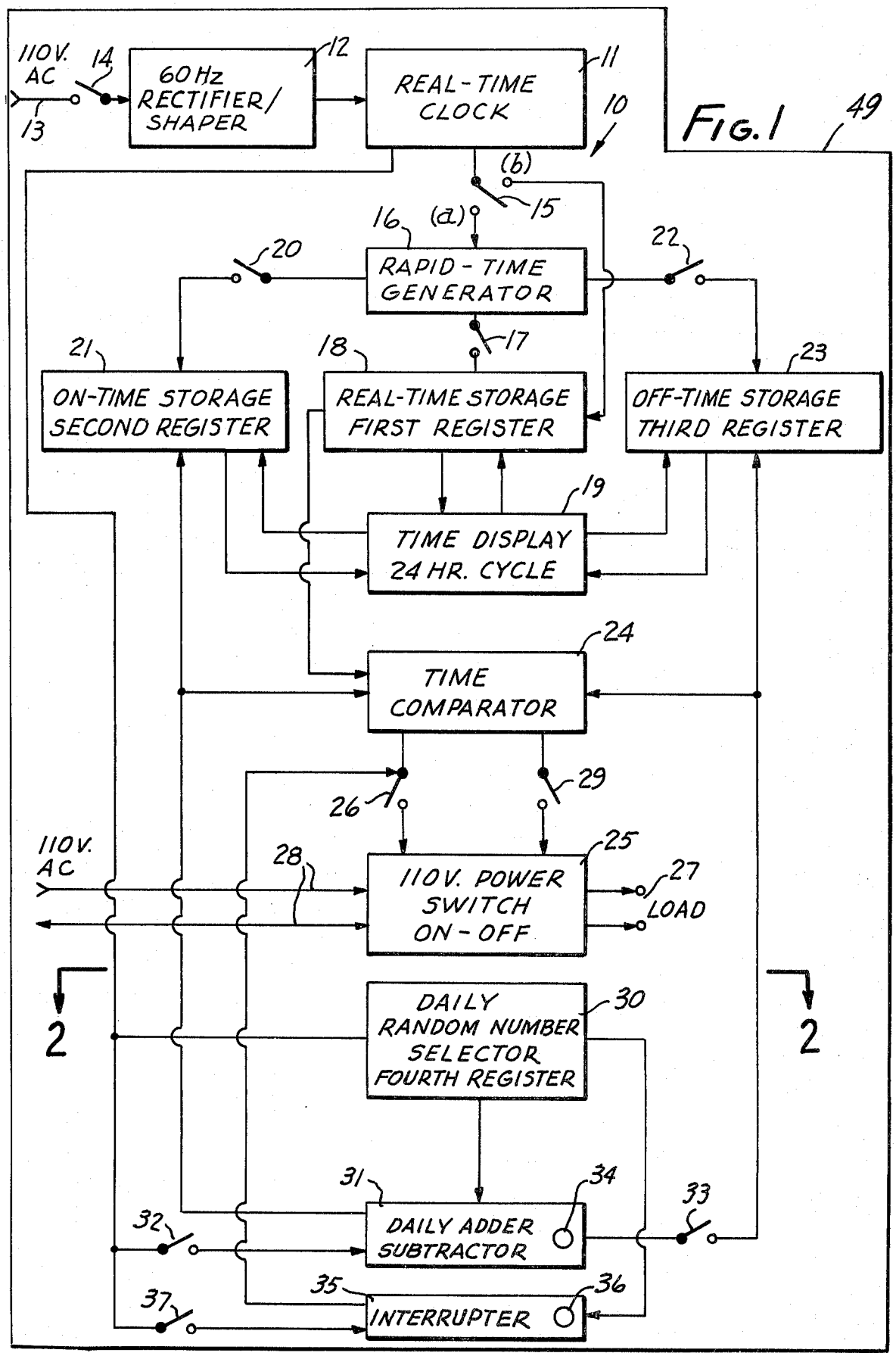
FIG. 1, is a block electrical circuit diagram of the room occupancy power programmer of this invention.

Referring to the block circuit diagram of FIG. 1, the room occupancy power programmer 10 has electronic integrated microchip structure. A calendar real-time clock 11 microcircuit, together with real-time storage first register 18, provides calendar real-time, which can be displayed on the digital time display 19.

In FIG. 1, a power source comprises the 60 Hz, or the like, power at 110 V AC transmitted by the house wiring 13 and the rectifier/shaper integrated microcircuit 12, together providing 60 Hz, or the like, square waves. The resultant 60 Hz shaped square waves drive the clock 11, and the waves are further counted in clock 11 by series connected integrated microcircuit counters, providing calendar real-time second, minute and hour timing pulses.

The clock 11 also includes instructions for calendar real-time storage first, second and third registers, respectively 18, 21 and 23, which can register calendar real-time values. The clock 11 microcircuit can also have a high frequency power pulse source, typically ranging from approximately 32 k Hz to 250 k Hz, connected to clock 11 series connected microcircuit counters, as shown in detail in FIG. 4. The counters provide frequency division, ultimately providing a calendar second, minute and hour operating pulse signal. The clock 11 operates a calendar real-time storage first register 18 through instructions embodied in clock 11 microcircuit. The clock 11, utilizing its instructions, can also provide calendar real-time values for the second and third registers, respectively 21 and 23.

Referring again to FIG. 1, the programmer 10 is activated by electrical power received on room wiring 13 when the power is activated by switch 14. A double throw switch 15 conductively connects the real-time clock 11 to the rapid-time pulse generator 16 on closure of switch 15(a), and can also connect clock 11 directly to the real-time storage register 18 by operatively connecting at switch position 15(b). On momentarily closing switch 17, the rapid-time pulse generator 16 is conductively connected to the real-time first register 18, and thence to the digital time display 19. Closing 15(a) and 17 drives the rapid-time pulse generator 16, speeding up the generation of normal one-minute time pulses to an apparent rate of a one-minute time pulse every 0.1 to 0.2 second, or the like. The time display is rapidly driven to the correct calendar real-time, and switch 17 is opened, storing the calendar real-time as binary bits in the first register 18.

The rapid-time pulse generator 16 can then be momentarily conductively connected by switch 20 to the ON-time storage second register 21, driving the time display 19 to a selected real-time value on display 19, at which time the switch 20 is opened. The ON-time value displayed on 19 is then stored as binary bits in the second register 21.

Again, the rapid-time pulse generator 16 can be momentarily connected conductively by switch 22 to the OFF-time storage third register 23, driving the time display to a selected real-time value, at which time the switch 22 is opened. The OFF-time value is then stored as binary bits in the third register 23.

The switch 15 is then automatically closed in position 15(b), the real-time clock 11 then continuously drives the real-time storage register 18 and the time display 19. A figure of the digital time display 19 provides a marking of AM and PM on the 24 hour calendar real-time scale. By speeding up the time display 19, utilizing the rapid-time generator 16, it is possible to reset the registers 18, 21 and 23 in a few minutes of real-time.

The real-time first register 18 has a real-time value stored therein and continually advancing with real-time, and also advancing in the time comparator 24, which has instructions stored therein. In the comparator 24, the real-time value of 18 is continuously compared to the ON-time value stored in second register 21. When the time value of 18 is equivalent to the ON-time value stored in second register 21, the comparator 24 signals the 110 V power switch 25, through switch 26, to turn the 110 V power of line 28 ON, operating load 27. Likewise, when the real-time value of first register 18 is compared to and equivalent to the OFF-time value stored in third register 23, the time comparator 24 signals the 110 V power switch 25 through switch 29, to turn OFF switch 25.

A random small number selector register 30 is conductively connected to the real-time clock 11, the clock 11 providing a signal every 24 calendar hours to small number selector register 30. At any selected time in the 24 hours, the selector register 30 provides a small random number, which can be typically in the range equivalent of 1 to 5. The selected random number is stored in the fourth register 30, and conductively passed to the daily adder/subtractor 31. The daily adder/subtractor 31 then daily, at a selected real time, adds or subtracts the random real number provided by 30, from the ON-time value or the OFF-time value stored in the respective second register 21, or the third register 23, dependent on the pre-set closure of switches 32 and 33 respectively. An adjustment switch 34 can manually set the adder/subtractor 31 in the add (+) mode or the subtract (−) mode as desired. Thus, the daily adder/subtractor 31 can provide a varying daily operating schedule for the lights and electrically powered devices driven by the room power as load 27. The daily time variation provides an additional image of room occupancy during the absence of the legal occupant.

An interrupter 35 is conductively connected to the clock 11 and to the daily random number selector register 30, being instructed on a daily 24 hour time basis to interrupt the ON switch 26 activating the power switch 25. Thus, the interrupter 35 can be instructed by the adjustment key 36 to interrupt or open switch 26, once every hour, or at any preset timing interval as key 36 is so set. The switch 37 can be closed to place the interrupter in operation as so desired by the room legal occupant. The time range of the interruption is generated by the random number selector register 30. The random number thus selected becomes equivalent to the number of minutes of interruption of load 27.

Figure 2:
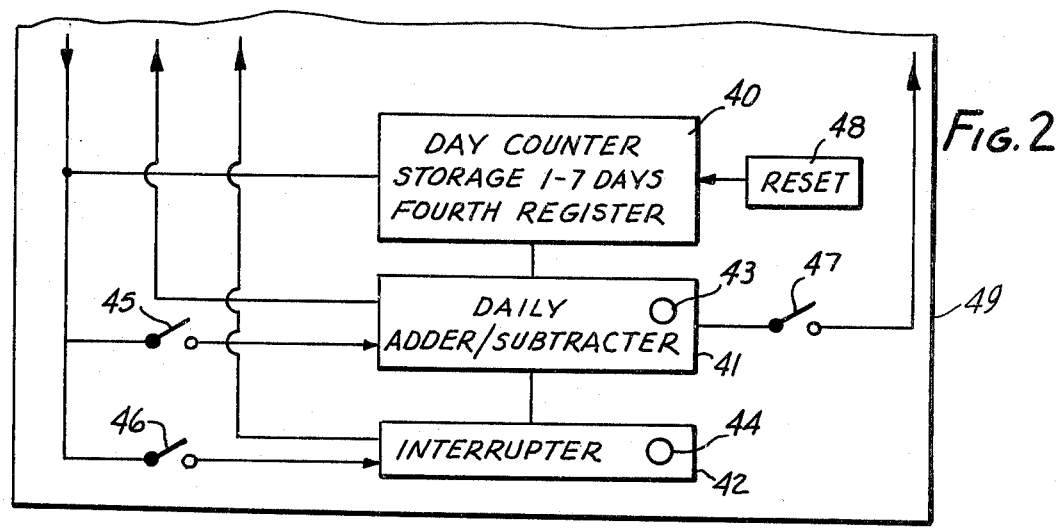
FIG. 2 is a further modification of the block electrical circuit diagram below 2—2 of FIG. 1.

A further modification of my room occupancy invention is illustrated in FIG. 2, wherein the circuit below 2—2, of FIG. 1 is replaced by the circuit of FIG. 2. The day counter 40 then replaces the random number selector register 30, in the programmer 10 circuit. The day counter 40 receives a daily 24 hour time signal from clock 11, and then the counter 40 advances one day to a total of seven days, or any other selected number of days, before it recycles to the first or one day. Each day in the day count of counter 40 can then become an equivalent number of real-time minutes, or the like, on which the daily adder/subtracter 41, and the interrupter 42, operate each day, as described above for the circuit of FIG. 1. The instruction key 43 is equivalent to key 34, the switch 44 is equivalent to switch 36, and switches 45, 46 and 47 are equivalent to switches 32, 37 and 33 respectively. A reset means 48 provides for manually resetting the day count cycle of counter 40 back to the day one (1).

The components of the room occupancy programmer 10 comprise well known microelectronic circuit chip construction. The components 11, 16, 18, 21, 23, 19, 24, 25, 30, 31, 35, and the like, are illustrated in the FIG. 1 as discrete units, but they can be comingled in the integrated microelectronic circuit construction of the programmer 10. Utilizing integrated circuits, the specific components listed above can be provided in a relatively simple microelectronic circuit chip device together with a digital display 19.

The real-time clock 11 normally has binary bit chain means providing an output pulse rate in units of minutes, which can be read at 19 in hours and minutes.

The rapid-time pulse generator 16 has the well known microelectronic chip binary bit chains enabling the counting of the oscillator pulse at a fast rate, as desired.

Figure 3:
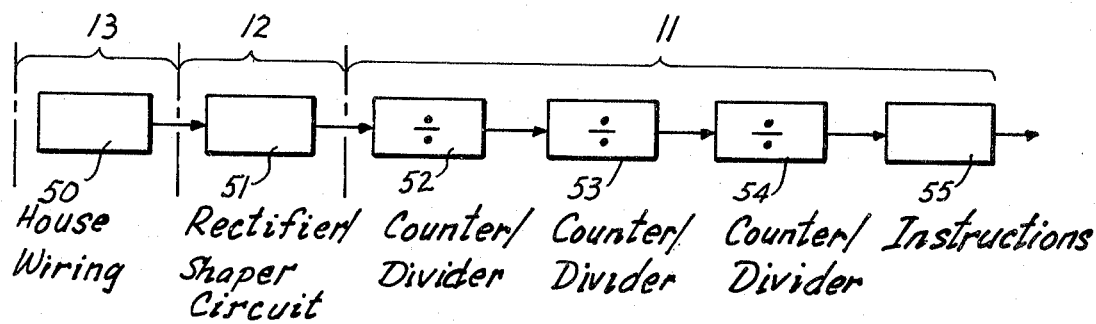
FIG. 3 illustrates further details of the 60 Hz power pulse source shown in FIG. 1.
Figure 4:
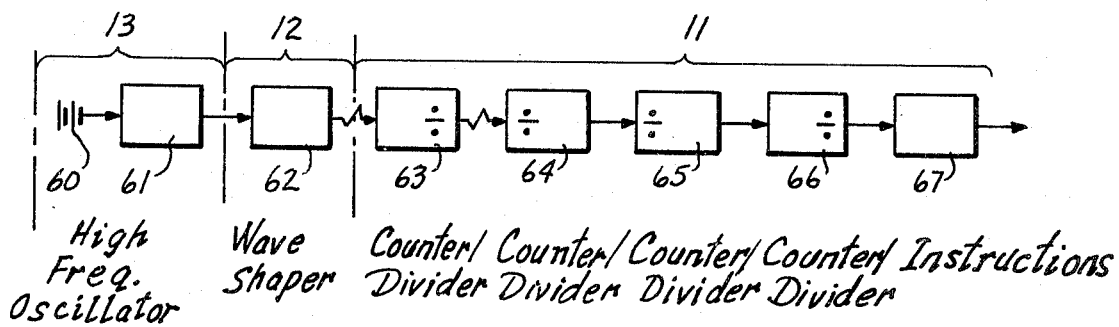
FIG. 4 illustrates a further modification of the power pulse source equivalent to the power pulse source of FIG. 3. The timing supply of FIG. 4 is battery operated, hence the real-time value is independently displayed during a utility power supply interruption.

Referring to FIGS. 3 and 4 together in detail, each one has an electrical power pulse source. In FIG. 3, the pulse source is the 60 Hz power at 110 V AC from house wiring 50, which is equivalent to 13 of FIG. 1, and combined with the rectifier/shaper circuit 51, which is equivalent to 12. The clock 11 has the multiple series of counters 52, 53, 54 which divide down the shaped square waves of 60 Hz to seconds, minutes and hour pulses as required, and which in conjunction with the instructions 55 provide the clock 11.

In FIGS. 3 and 4, the set of component systems 11, 12 and 13 are equivalent. Specifically, in FIG. 4, the battery 60 and the high frequency oscillator 61 are equivalent to 13 of FIG. 1. The wave shaper 62 is equivalent to 12 and 51, and the multiple series of counter/dividers 63, 64, 65, 66 divide the frequency down to provide second, minute and hour pulses, which are fed to the instructions 67. The multiple counters are the number required to provide the real-time generated pulses as required.

The microprocessor integrated circuit chip is small enough in size to mount the whole programmer 10 in a conventional standard room wall electrical wiring switch or wall power outlet box 49. An outlet box 49 suitable for containing a conventional single wall light switch or wall power prong plug outlet is large enough. The wall switch or the prong plug outlet can be combined with the programmer 10, in the wall outlet box 49, making possible the installation of the cooperative combination in millions of existing rooms, utilizing existing electrical power wiring in power wall outlet boxes. New rooms can be so programmed on construction. A standard size wall outlet box 49 typically has dimensions of 5 cm wide×7 cm height×5.5 cm deep.

Many modifications in the room occupancy power programmer can be made in the light of my teachings. It is understood that within the scope of the claims, the invention can be practiced otherwise than as described.

I claim:

1. In a room occupancy electrical power programmer adapted to controlling the power output of a room wiring power circuit with a calendar real-time schedule, the combination comprising:

an electrical power pulse microcircuit source means comprises a battery, a microcircuit high frequency oscillator, and a microcircuit rectifier/shaper of frequencies produced by said oscillator, said frequencies ranging from 32 k Hz to 250 k Hz, said means adaptively sized to dispose in a conventional size room wall electrical outlet box, aforesaid pulse microcircuit source means providing an electrical power pulse;

a real-time microcircuit clock means adapted to provide calendar real-time signals from said power pulse source, said real time clock means adaptively sized to dispose in aforesaid room wall electrical outlet box;

a real-time storage microcircuit first register means, said first register means adaptively sized to dispose in aforesaid wall electrical outlet box;

an ON-time storage microcircuit second register means, said second register means adaptively sized to dispose in aforesaid wall electrical outlet box;

an OFF-time storage microcircuit third register means, said third register means adaptively sized to dispose in aforesaid wall electrical outlet box;

a rapid-time pulse generator microcircuit means, said rapid time pulse generator means adaptively sized to dispose in aforesaid wall electrical outlet box;

a digital time display means, said time display means adaptively sized to dispose in aforesaid wall electrical outlet box;

switching and microcircuit connecting means adapted to interconnect said real-time clock means, with said real-time first register means, with said ON-time register means, with said OFF-time register means, with said rapid-time generator means, and with said time display means, as each are required, said switching and microcircuit connecting means adaptively sized to dispose in aforesaid wall electrical outlet box;

a time comparator means, separately adapted to interconnect said real-time first register means with said ON-time second register means, and separately with said OFF-time third register means, said comparator means providing an equivalence signal when said ON-time second register means and said real-time first register means have the same time value, said comparator means providing a separate equivalence signal when said OFF-time third register means and said real-time first register means have the same value, and said comparator means providing a separate operational signal on a separate signal of ON and OFF equivalence, said time comparator means adaptively sized to dispose in aforesaid wall electrical outlet box;

a power switch conductively connecting the room utility power wiring and said time comparator means, said power switch operating ON and OFF with respect to said power wiring when a separate signal of ON and OFF equivalence is received from said time comparator means, said power switch adaptively sized to dispose in aforesaid wall electrical outlet box;

a daily number selector having a microcircuit chip comprising binary bit counting and storage means, said selector adapted to provide a small number on input signal from the connected said real-time clock indicating the passage of 24 hours real-time, and said selector operatively connected to a daily adder/subtracter, said selector being disposable in aforesaid outlet box;

a daily adder/subtractor having a microcircuit chip comprising binary bit counting and storage means, said adder/subtracter adapted to adding and subtracting a selected number input signal from said number selector on operatively connecting said adder/subtracter to said ON-time storage second register, and on operatively connecting said adder/subtracter to said OFF-time storage third register, said adder/subtracter alternatively operating in the add and subtraction mode as directed by an (+) and (−) operation key, said adder/subtracter being disposable in aforesaid outlet box; and, aforesaid combination adapted to be conductively secured together inside aforesaid conventional size room wall electrical outlet box and to be conductively connected to the electrical room wiring disposed in aforesaid outlet box.

2. In a room occupancy electrical power programmer adapted to controlling the power output of a room wiring power circuit with a calendar real-time schedule, the combination comprising:

an electrical power pulse microcircuit source means;
a real-time microcircuit clock means adapted to provide calendar real-time signals from said power pulse source;
a real-time storage microcircuit first register means;
an ON-time storage microcircuit second register means;
an OFF-time storage microcircuit third register means;
a rapid-time pulse generator microcircuit means;
a digital time display means;
switching and microcircuit connecting means adapted to interconnect said real-time clock means, with said real-time first register means, with said ON-time register means, with said OFF-time register means, with said rapid-time generator means, and with said time display means, as each are required;
a time comparator means separately adapted to interconnect said real-time first register means with said ON-time second register means, and separately with said OFF-time third register means, said comparator means providing an equivalence signal when said ON-time second register means and said real-time first register means have the same time value, said comparator means providing a separate equivalence signal when said OFF-time third register means and said real-time first register means have the same value, and said comparator means providing a separate operational signal on a separate signal of ON and OFF equivalence;
a power switch conductively connecting the room utility power wiring and said time comparator means, said power switch operating ON and OFF with respect to said power wiring when a separate signal of ON and OFF equivalence is received from said time comparator means;
a daily number selector having a microcircuit chip comprising binary bit counting and storage means, said selector adapted to provide a small number on input signal from the connected said real-time clock indicating the passage of 24 hours real-time, and said selector operatively connected to a daily adder/subtracter, said selector being disposable in aforesaid outlet box;

a daily adder/subtracter having a microcircuit chip comprising binary bit counting and storage means, said adder/subtracter adapted to adding and subtracting a selected number input signal from said random number selector on operatively connecting said adder/subtracter to said ON-time storage second register, and on operatively connecting said adder/subtracter to said OFF-time storage third register, said adder/subtracter alternatively operating in the add and subtraction mode as directed by a (+) and (−) operation key, said adder/subtracter being disposable in aforesaid outlet box; and, all aforesaid combination adapted to and sized to be secured inside a conventional standard size room wall electrical outlet box and conductively connected to the electrical room wiring disposed in said outlet box.

3. In the combination set forth in claim 2, the further modification wherein said electrical power pulse source microcircuit means comprises a battery, a microcircuit high frequency oscillator, and a microcircuit rectifier/shaper of frequencies produced by said oscillator, said frequencies ranging from 32 k Hz to 250 k Hz.

4. In the combination set forth in claim 2, the further modification wherein said electrical power pulse source microcircuit means comprises a commercial power input ranging in frequency from 25 to 60 Hz, and a microcircuit rectifier/shaper of said 25 to 60 Hz, providing a square wave.

5. In a room occupying electrical power programmer adapted to controlling the power output of a room wiring power circuit with a calendar real-time schedule, the combination comprising:

an electrical power pulse microcircuit source means, said power pulse means being disposable in a wall electrical outlet box;
a real-time microcircuit clock means adapted to provide calendar real-time signals from said power pulse source, said real-time clock means being disposable in aforesaid wall electrical outlet box;
a real-time storage microcircuit first register means, said real-time storage first register means being disposable in aforesaid electrical outlet box;
an ON-time storage microcircuit second register means, said ON-time storage second register means being disposable in aforesaid electrical outlet box;
an OFF-time storage microcircuit third register means, said OFF-time storage third register means being disposable in aforesaid electrical outlet box;
a rapid-time pulse generator microcircuit means, said rapid-time pulse generator means being disposable in aforesaid wall electrical outlet box;
a digital time display means, said digital time display means being disposable in aforesaid wall electrical outlet box;
switching and microcircuit connecting means adapted to interconnect said real-time clock means with said real-time first register means, with said ON-time register means, with said OFF-time register means, with said rapid-time generator means, and with said time display means, as each are required, said switching and connecting means being disposable in aforesaid wall electrical outlet box;
a time comparator means separately adapted to interconnect said real-time first register means with said ON-time second register means, and separately with said OFF-time third register means, said comparator means providing an equivalence signal when said ON-time second register means and said real-time first register means have the same time value, said comparator means providing a separate equivalence signal when said OFF-time third register means and said real-time first register means have the same value, and said comparator means providing a separate operational signal on a separate signal of ON and OFF equivalence, said time comparator means being disposable in aforesaid wall electrical outlet box;

a power switch conductively connected to the room utility power wiring, and said time comparator means, said power switch operating ON and OFF with respect to said power wiring when a separate signal of ON and OFF equivalence is received from said time comparator means, said power switch being disposable in aforesaid wall electrical outlet box;

a daily number selector having microcircuit chip comprising binary bit counting and storage means, said selector adapted to provide a small number on input signal from the connected said real-time clock indicating the passage of 24 hours real-time, and said selector operatively connected to a daily adder/subtractor, said selector being disposable in aforesaid wall electrical outlet box;

a daily adder/subtractor having a microcircuit chip comprising binary bit counting and storage means, said adder/subtractor adapted to adding and subtracting a selected number input signal from said random number selector on operatively connecting said adder/subtractor to said ON-time storage second register, and on operatively connecting said adder/subtractor to said OFF-time storage third register, said adder/subtractor alternatively operating in the add and subtraction mode as directed by a (+) and (−) operation key, said adder/subtractor being disposable in aforesaid wall electrical outlet box; a room wall electrical outlet box: and, aforesaid pulse source means, real-time first register means, ON-time second register means, OFF-time third register means, rapid-time pulse generator means, a digital time display means, switching and microcircuit connecting means, time comparator means, power switch, daily number selector, and daily adder-subtractor disposed and electrically conductively secured in said room wall electrical outlet box.

* * * * *